(No Model.)
W. W. DUFFIELD.
DRAFTSMAN'S PROTRACTOR.
No. 407,515. Patented July 23, 1889.
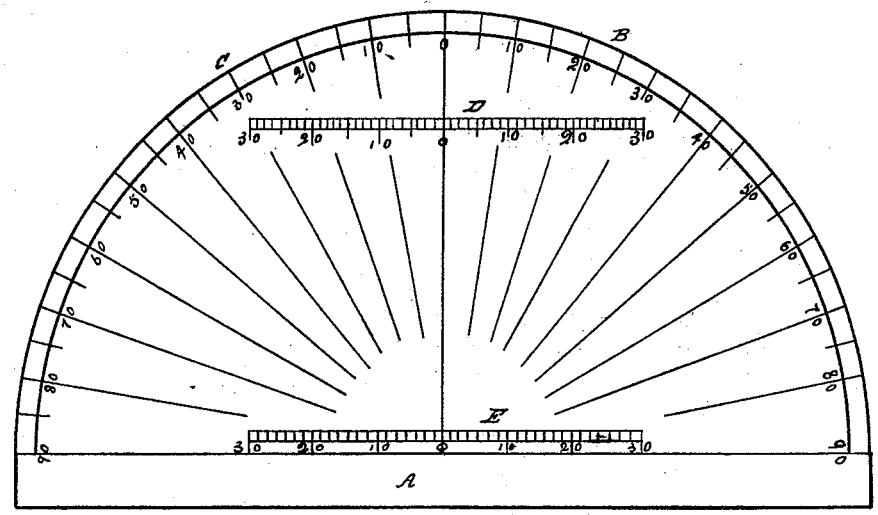
Witnesses
Adelaide A. Anderson
Cyrus E. Lothrop
Inventor
William W. Duffield
by Geo. H. Lothrop
atty.

UNITED STATES PATENT OFFICE.

WILLIAM W. DUFFIELD, OF DETROIT, MICHIGAN.

DRAFTSMAN'S PROTRACTOR.

SPECIFICATION forming part of Letters Patent No. 407,515, dated July 23, 1889.

Application filed May 2, 1889. Serial No. 309,335. (No model.)

*To all whom it may concern:*

Be it known that I, WILLIAM W. DUFFIELD, of Detroit, in the county of Wayne and State of Michigan, have invented a new and useful Improvement in Draftsmen's Protractors, of which the following is a specification.

My invention consists in an improved draftsman's protractor, hereinafter fully described and claimed.

The drawing is a plan view.

A represents the protractor, which is preferably made of glass, celluloid, horn, or other transparent material. That part of it which is divided into degrees from 0 to 90, as shown in the drawing, is a semicircle. The circumference is divided each way from the center, as shown at B and C, into degrees and minutes. On the horizontal or ninety-degree line a scale of equal parts is laid out on both sides of the zero-line, as represented at E, and I prefer to make this scale twenty divisions to the inch.

D represents a scale, similar to and parallel with scale E, drawn as near the circumference of the protractor as the outer graduations will permit. The degree-lines from the outer graduation are preferably prolonged toward the center of the protractor, as shown in the drawing.

The use of my invention is as follows: Parallel meridian-lines at intervals of three inches are first drawn with pencil over the entire surface of the proposed map. To lay out upon such map the direct bearing of any required compass-course, the center of the protractor—that is, the zero-point on the ninety-degree line—is made to coincide with the beginning of such course, and the protractor is then revolved about its center until the nearest pencil meridian on the map intersects the same division on both the scales D and E. The vertical or zero line of the protractor will then be parallel with such meridian, and the center of the protractor coinciding with the beginning of the desired course the requisite bearing of such course can be laid off from the graduations of the circumference of the protractor. This enables the draftsman to correctly and rapidly lay off angles or compass courses.

What I claim as my invention, and desire to secure by Letters Patent, is—

1. A draftsman's protractor made in semicircular form having its circumference graduated equally in both directions from the vertical center and having thereon two equal parallel scales, each laid off on both sides of the vertical center, and located, respectively, between the horizontal or ninety-degree line and the circle of graduations at the circumference, substantially as shown and described.

2. A draftsman's protractor having outer graduated lines extending both ways from its center and having two equal parallel immovable scales located wholly between the horizontal or ninety-degree line and the circle of graduations at the circumference, substantially as and for the purposes set forth.

WILLIAM W. DUFFIELD.

Witnesses:
 WILL WARD DUFFIELD,
 FRANK E. JACKSON.